US009632182B2

(12) United States Patent
Oh et al.

(10) Patent No.: US 9,632,182 B2
(45) Date of Patent: Apr. 25, 2017

(54) VEHICLE POSITIONING APPARATUS AND METHOD

(71) Applicant: Hyundai Motor Company, Seoul (KR)

(72) Inventors: Young Chul Oh, Gyeonggi-Do (KR); Myung Seon Heo, Seoul (KR); Byung Yong You, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 175 days.

(21) Appl. No.: 14/553,808

(22) Filed: Nov. 25, 2014

(65) Prior Publication Data

US 2016/0018527 A1 Jan. 21, 2016

(30) Foreign Application Priority Data

Jul. 15, 2014 (KR) ........................ 10-2014-0089246

(51) Int. Cl.
*G01S 19/13* (2010.01)
*G01S 19/05* (2010.01)
*G01S 19/07* (2010.01)
*G01S 19/28* (2010.01)
*G01S 19/45* (2010.01)

(52) U.S. Cl.
CPC .............. *G01S 19/13* (2013.01); *G01S 19/05* (2013.01); *G01S 19/07* (2013.01); *G01S 19/28* (2013.01); *G01S 19/45* (2013.01)

(58) Field of Classification Search
CPC .......... G01S 19/07; G01S 11/10; G01S 19/13; G01S 19/21
USPC .................................................... 701/96, 468
See application file for complete search history.

(56) References Cited

U.S. PATENT DOCUMENTS

| | | | |
|---|---|---|---|
| 6,230,093 B1 | 5/2001 | Michi et al. | |
| 2012/0105271 A1* | 5/2012 | Watanabe | G01S 19/47 342/147 |
| 2013/0116908 A1* | 5/2013 | Oh | G01S 19/07 701/96 |
| 2013/0210453 A1* | 8/2013 | Shirai | H04W 64/006 455/456.1 |
| 2016/0018527 A1* | 1/2016 | Oh | G01S 19/05 701/468 |

FOREIGN PATENT DOCUMENTS

| | | | |
|---|---|---|---|
| JP | 2011-033413 A | 2/2011 | |
| JP | 2011-204149 A | 10/2011 | |
| KR | 10-2001-0013119 A | 2/2001 | |
| KR | 10-1231534 B1 | 2/2013 | |
| KR | 10-2013-0050112 A | 5/2013 | |
| KR | 2013-0065114 A | 6/2013 | |
| KR | 10-1326889 B1 | 11/2013 | |
| KR | 10-2014-0062272 A | 5/2014 | |

* cited by examiner

*Primary Examiner* — Redhwan K Mawari
(74) *Attorney, Agent, or Firm* — Mintz Levin Cohn Ferris Glovsky and Popeo, P.C.; Peter F. Corless

(57) ABSTRACT

A vehicle positioning apparatus and method are provided that are capable of more accurately measuring the position of a traveling vehicle without interoperating with a DGPS. The method includes calculating a position of the traveling vehicle based on coordinates of the respective GPS satellites shared by a surrounding vehicle and the traveling vehicle. In addition, a position coordinate is calculated of the surrounding vehicle measured by the reference of the traveling vehicle.

15 Claims, 3 Drawing Sheets

VEHICLE POSITIONING APPARATUS AND METHOD

CROSS-REFERENCE TO RELATED APPLICATION

This application is based on and claims priority from Korean Patent Application No. 10-2014-0089246, filed on Jul. 15, 2014 in the Korean Intellectual Property Office, the disclosure of which is incorporated herein in its entirety by reference.

BACKGROUND

Field of the Invention

The present invention relates to a vehicle positioning apparatus and method, and more particularly, to a technology for more accurately calculating a position of a traveling vehicle based on coordinates of the respective GPS satellites shared by a surrounding vehicle and the traveling vehicle, and a position coordinate of the surrounding vehicle measured by the reference of the traveling vehicle.

Description of the Prior Art

In general, the error range of a position measured using a GPS (Global Positioning System) is about 5~15 m, and since the error is generated up to maximum about 30 m depending on the radio environment, it may be difficult to apply to a vehicle safety technology. Accordingly, in the vehicle safety technology field, the satellite navigation correction system (DGPS: Differential Global Positioning System) is widely used. DGPS is a GPS survey technology of a relative positioning method, and the elements causing an error are corrected using the already known reference coordinate, to obtain more accurate position information.

The conventional vehicle positioning apparatus measures the position of a traveling vehicle by correcting GPS information using the DGPS correction signal received from RSU (Roadside Unit). Therefore, as the conventional vehicle positioning apparatus moves away from RSU, the positioning accuracy of the apparatus decreases. Accordingly, the conventional vehicle positioning apparatus may not measure the accurate position of a traveling vehicle when the apparatus is not interoperated with DGPS.

SUMMARY

The present invention provides a vehicle positioning apparatus and method capable of more accurately measuring the position of a traveling vehicle without interoperating with DGPS, by calculating a position of the traveling vehicle based on coordinates of the respective GPS satellites shared by a surrounding vehicle and the traveling vehicle, and a position coordinate of the surrounding vehicle measured by the reference of the traveling vehicle.

The object of the present invention is not limited to the above-mentioned object, and, not mentioned, other objects and advantages of the present invention can be understood by the following description, and they will become apparent by exemplary embodiments of the present invention. In addition, it will be seen that the objects and advantages of the present invention can be realized by means described in the claims and combination thereof.

According to the present invention, the vehicle positioning apparatus may include: a communicator configured to receive coordinates of GPS satellites and pseudo distances for each of the GPS satellites from a first vehicle; a GPS receiver configured to receive coordinates of the GPS satellites from the GPS satellites, and calculate pseudo distances for each of the GPS satellites; a measurer configured to measure a coordinate of the first vehicle by a reference of a traveling vehicle; and a controller configured to calculate a position of the traveling vehicle based on the coordinates of GPS satellites and the pseudo distances for each of the GPS satellites received via the communicator, and the coordinates of the GPS satellites and the pseudo distances for each of the GPS satellites from the GPS receiver, and the coordinate of the first vehicle measured by the measurer.

Further, to achieve the above object, according to the present invention, the vehicle positioning method may include: receiving coordinates of GPS satellites and pseudo distances for each of the GPS satellites from a first vehicle by a communicator; receiving coordinates of the GPS satellites from the GPS satellites, and calculating pseudo distances for each of the GPS satellites by a GPS receiver; measuring a coordinate of the first vehicle by a reference of a traveling vehicle by a measurer; and calculating a position of the traveling vehicle based on the coordinates of GPS satellites and the pseudo distances for each of the GPS satellites received via the communicator, and the coordinates of the GPS satellites and the pseudo distances for each of the GPS satellites from the GPS receiver, and the coordinate of the first vehicle measured by the measurer by a controller.

As the above described, the present invention has the effect capable of more accurately measuring the position of a traveling vehicle without interoperating with DGPS, by calculating a position of the traveling vehicle based on coordinates of the respective GPS satellites shared by a surrounding vehicle and the traveling vehicle, and a position coordinate of the surrounding vehicle measured by the reference of the traveling vehicle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
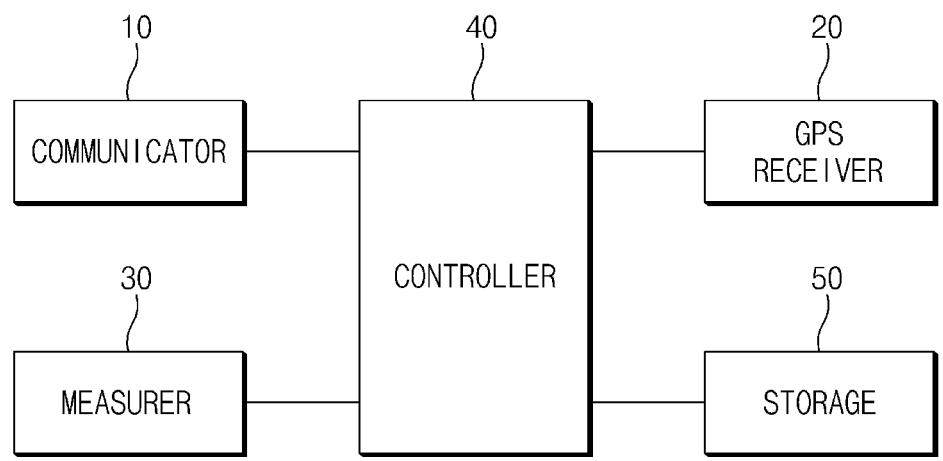
FIG. 1 is an exemplary diagram of a vehicle positioning apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The foregoing objects, features and advantages will be more apparent through the detail description as below with reference to the accompanying drawings, and thus the those skilled in the art can be easily embody the technical spirit of the present invention. Further, in the following description of the present invention, if it is determined that the detailed description for the known art related to the present invention unnecessarily obscures the gist of the present invention, the detailed description thereof will be omitted. Hereinafter, with reference to the accompanying drawings, preferred embodiments of the present invention will be described in detail.

FIG. 1 is an exemplary diagram of a vehicle positioning apparatus according to an exemplary embodiment of the present invention. As shown in FIG. 1, a vehicle positioning apparatus may include a communicator 10, a GPS receiver 20, a measurer 30, a controller 40 and storage 50. The controller 40 may be configured to operate the communicator 10, the GPS receiver 20, the measurer 30, and the storage 50.

In particular, the communicator 10 may be configured to communicate with a surrounding vehicle (hereinafter, referred to as a "first vehicle") via V2X (Vehicle to Everything) communication. The communicator 10 may be configured to receive the coordinates of GPS satellites and the pseudo range for each of GPS satellites. The coordinates of GPS satellites may be information received by the GPS receiver of the first vehicle (not shown), and the pseudo range for each of GPS satellites may be the value calculated by the GPS receiver (not shown).

Further, the GPS receiver 20 may be configured to receive the coordinates of GPS satellites from GPS satellites and calculate the pseudo range for each of GPS satellites. The pseudo range for each of GPS satellites may be the value calculated by the GPS receiver 20, and as an example, the GPS receiver 20 may be configured to calculate the value by adding the distance to the GPS satellite to the result which multiplies the speed of light and the clock error of the GPS receiver 20. The measurer 30 may be a sensor (e.g., Lidar, Radar) configured to detect the first vehicle, and measure the position (e.g., coordinate) of the first vehicle by the reference of the traveling vehicle. In other words, the measurer 30 may be configured to measure the relative position (e.g., coordinate) for the traveling vehicle (e.g., the position of the first vehicle relative to the traveling vehicle).

The controller 40 may be configured to determine the number of the common GPS satellites using the coordinates of the GPS satellites received by the communicator 10 and the coordinates of the GPS satellites received by the GPS receiver 20, and after that, activate the measurer 30 when the number is greater than a threshold value (e.g., 3). In addition, the controller 40 may be configured to calculate the position of the traveling vehicle based on the coordinates of the GPS satellites and the pseudo distances for each of the GPS satellites received using the communicator 10, the coordinates of the GPS satellites and the pseudo distances for each of the GPS satellites from the GPS receiver 20, and the coordinate of the first vehicle measured by measurer 30. In particular, the controller 40 may be configured to separate the situation in which the number (N) of GPS satellites is greater than 3 and less than 5 (e.g., $3 \leq N < 5$) and in which the number (N) of GPS satellites is greater than 5 (e.g., $N \geq 5$), and calculate the position of the traveling vehicle using different methods.

Figure 2:
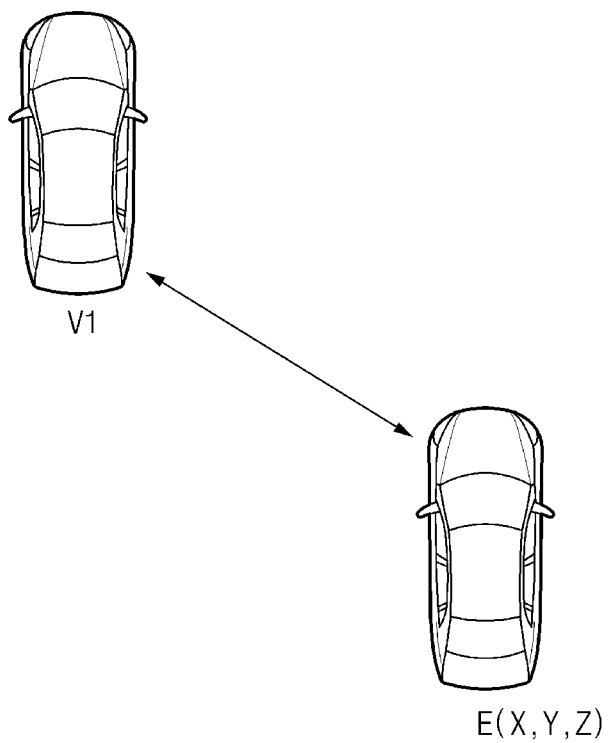
FIG. 2 is an exemplary diagram of a vehicle positioning method according to an exemplary embodiment of the present invention.

Hereinafter, the method of calculating the position of the traveling vehicle will be described with reference to FIG. 2. In FIG. 2, V1 denotes the first vehicle, and E(X, Y, Z) denotes the traveling vehicle. The positioning apparatus may be mounted within the traveling vehicle.

The controller 40 may be configured to identify the number (N) of the common GPS satellites by comparing the coordinates of the GPS satellites received from the communicator 10 from the first vehicle, and the coordinates of the GPS satellites received from the GPS receiver 20. Accordingly, when the number (N) of the common satellites satisfies $3 \leq N < 05$, the position (X, Y, Z) of the traveling vehicle is calculated based on the following Equation 1. In other words, when N=3, since total 6 equations are generated, the controller 40 may be configured to calculate the position (X, Y, Z) of the traveling vehicle.

$$(X-GXn)^2+(Y-GYn)^2+(Z-GZn)^2=(GnMD\_E-Cn)^2$$

$$(X+V1X-GXn)^2+(Y+V1Y-GYn)^2+(Z+V1Z-GZn)^2=(GnMD\_V1-Cn)^2 \quad \text{Equation 1}$$

wherein, (GXn, GYn, GZn) denotes the coordinate (constant) of n-th GPS satellite, and n is an identifier for detecting a GPS satellite, and as an example, when the number of GPS satellites is 3, n is 1, 2, 3. Additionally, GnMD_E denotes the pseudo distance (constant) of n-th GPS satellite calculated by the traveling vehicle, GnMD_V1 denotes the pseudo distance (constant) of n-th GPS satellite calculated by the first vehicle, and Cn denotes a correction distance of n-th GPS satellite.

Furthermore, when the number (N) of the common satellites satisfies $N \geq 5$, the position (X, Y, Z) of the traveling vehicle may be calculated based on the following Equation 2. In other words, when N=5, since total 10 equations are generated, the controller 40 may be configured to generate the position (X, Y, Z) of the traveling vehicle.

$$(X-GXn)^2+(Y-GYn)^2+(Z-GZn)^2=(GnMD\_E-ECn)^2$$

$$(X+V1X-GXn)^2+(Y+V1Y-GYn)^2+(Z+V1Z-GZn)^2= (GnMD\_V1-VCn)^2 \quad \text{Equation 2}$$

wherein, ECn denotes the pseudo distance of n-th GPS satellite for the traveling vehicle and VCn denotes the pseudo distance of n-th GPS satellite for the first vehicle.

The storage 50 may be configured to store the position of the traveling vehicle calculated by the controller 40. The present invention may be configured to calculate the position of the traveling vehicle based on the number of GPS satellites shared by the traveling vehicle and the first vehicle using different methods, and calculate a more accurate position when the number of GPS satellites is 5 compared to when the number of GPS satellites is 3.

Figure 3:
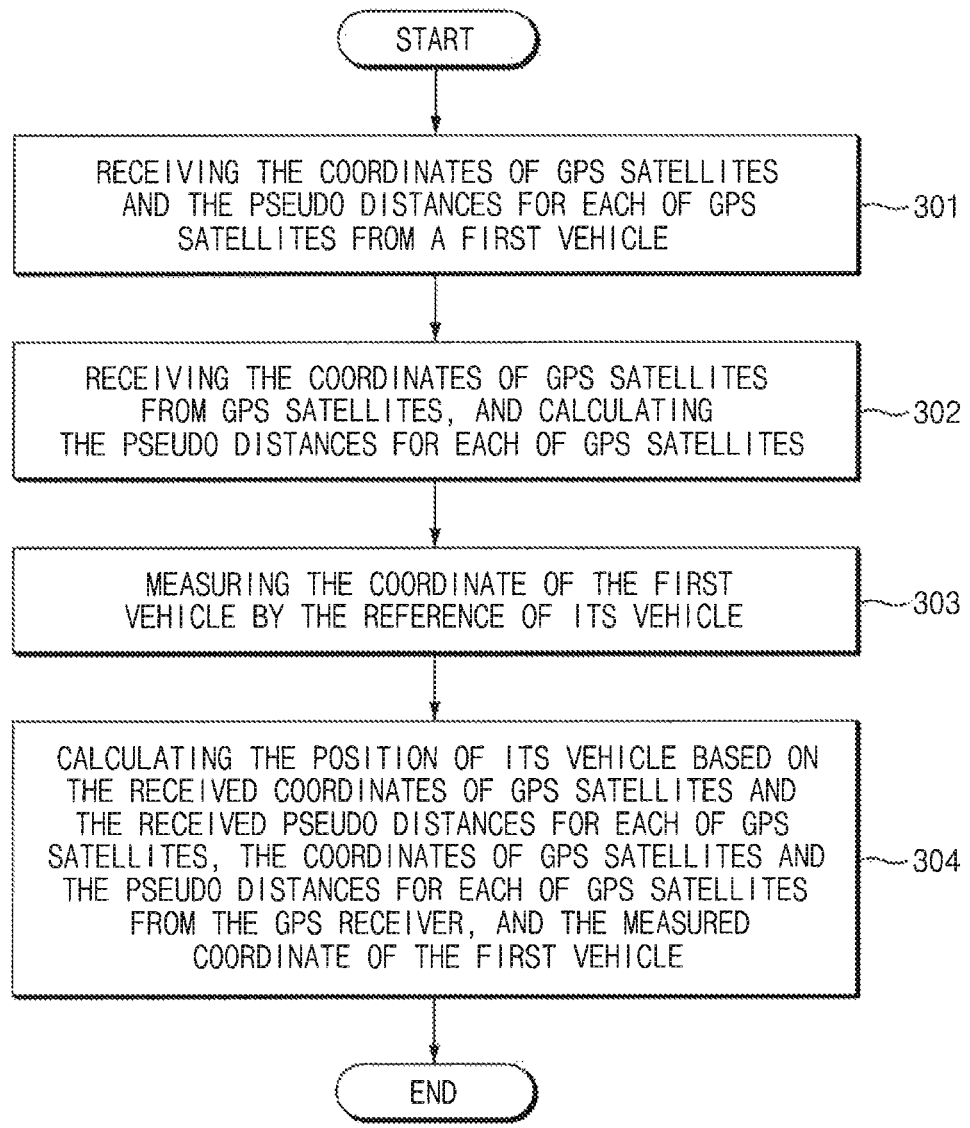
FIG. 3 is an exemplary flow chart of a vehicle positioning method according to an exemplary embodiment of the present invention.

FIG. 3 is an exemplary flow chart of an embodiment for a vehicle positioning method according to the present invention. First, the communicator 10 may be configured to receive the coordinates of GPS satellites and the pseudo distances for each of GPS satellites from the first vehicle (301). Additionally, the GPS receiver 20 may be configured to receive the coordinates of GPS satellites from GPS satellites, and calculate the pseudo distances for each of GPS satellites (302).

The measurer 30 may be configured to measure the position (coordinate) of the first vehicle by the reference of the traveling vehicle under the operation of the controller 40 (303). In other words, the controller 40 may be configured to detect the number of GPS satellites shared by the first vehicle and the traveling vehicle using the coordinates of GPS satellites received from the communicator 10 and the coordinates of GPS satellites received from the GPS receiver 20, and then activate the measurer 30 when the number is greater than 3. When the number of shared GPS satellites is less than 3, the position of the traveling vehicle may not be calculated. Then, the controller 40 may be configured to calculate the position of the traveling vehicle based on the coordinates of GPS satellites and the pseudo distances for each of GPS satellites received from the communicator 10, the coordinates of GPS satellites and the pseudo distances for each of GPS satellites from the GPS receiver 20, and the coordinate of the first vehicle measured by the measurer 30 (304).

The calculated position of the traveling vehicle may be stored in the storage 50. Accordingly, more accurate positioning of the traveling vehicle may be determined without interoperating with a DGPS. Further, as described above, the method of the present invention may be implemented as a computer program. The code and code segment constituting the program may be inferred by a computer programmer in the art. Additionally, the program may be stored in a non-transitory computer-readable recording media (information storage medium), and read and executed by a computer to implement the method of the present invention. The recording media includes all types of computer-readable recoding media.

As the above described, the present invention is not limited to the aforementioned exemplary embodiments and accompany drawings, since replacements, various modifications, and changes may be made without departing from the technical spirit of the present invention by those skilled in the art.

What is claimed is:

1. A vehicle positioning apparatus, comprising:
a memory configured to store program instructions; and
a processor configured to execute the program instructions, the program instructions when executed configured to:
receive first coordinates of global positioning system (GPS) satellites and first pseudo distances for each of the GPS satellites from a first vehicle;
receive second coordinates of the GPS satellites from the GPS satellites;
calculate second pseudo distances for each of the GPS satellites;
measure a coordinate of the first vehicle by a reference of a traveling vehicle; and
calculate a position of the traveling vehicle based on: the first coordinates of the GPS satellites and the first pseudo distances for each of the GPS satellites, the second coordinates of the GPS satellites and the second pseudo distances for each of the GPS satellites, and the measured coordinate of the first vehicle.

2. A vehicle positioning apparatus according to claim 1, wherein the program instructions when executed are further configured to measure a relative coordinate for a position of the traveling vehicle as the coordinate of the first vehicle.

3. A vehicle positioning apparatus according to claim 1, wherein the program instructions when executed are further configured to calculate the position of the traveling vehicle based on a number of GPS satellites shared by the first vehicle and the traveling vehicle using different methods.

4. A vehicle positioning apparatus according to claim 3, wherein the program instructions when executed are further configured to calculate the position (X, Y, Z) of the traveling vehicle based on following Equation A, when a number of the GPS satellites shared by the first vehicle and the traveling vehicle is greater than 3 and less than 5;

$$(X-GXn)^2+(Y-GYn)^2+(Z-GZn)^2=(GnMD\_E-Cn)^2$$

$$(X+V1X-GXn)^2+(Y+V1Y-GYn)^2+(Z+V1Z-GZn)^2= (GnMD\_V1-Cn)^2 \quad \text{Equation A}$$

wherein, (GXn, GYn, GZn) denotes the coordinate of n-th GPS satellite, GnMD_E denotes the pseudo distance of n-th GPS satellite calculated by the traveling vehicle, GnMD_V1 denotes the pseudo distance of n-th GPS satellite calculated by the first vehicle, and Cn denotes a correction distance of n-th GPS satellite.

5. A vehicle positioning apparatus according to claim 3, wherein the program instructions when executed are further configured to calculate the position (X, Y, Z) of the traveling vehicle based on following Equation B, when a number of the GPS satellites shared by the first vehicle and the traveling vehicle is greater than 5;

$$(X-GXn)^2+(Y-GYn)^2+(Z-GZn)^2=(GnMD\_E-ECn)^2$$

$$(X+V1X-GXn)^2+(Y+V1Y-GYn)^2+(Z+V1Z-GZn)^2= (GnMD\_V1-VCn)^2 \quad \text{Equation 2}$$

wherein, (GXn, GYn, GZn) denotes the coordinate of n-th GPS satellite, GnMD_E denotes the pseudo distance of n-th GPS satellite calculated by the traveling vehicle, GnMD_V1 denotes the pseudo distance of n-th GPS satellite calculated by the first vehicle, ECn denotes the pseudo distance of n-th GPS satellite for the traveling vehicle, and VCn denotes the pseudo distance of n-th GPS satellite for the first vehicle.

6. A vehicle positioning method, comprising:
- receiving, by a controller, first coordinates of global positioning system (GPS) satellites and first pseudo distances for each of the GPS satellites from a first vehicle;
- receiving, by the controller, second coordinates of the GPS satellites from the GPS satellites;
- calculating, by the controller, second pseudo distances for each of the GPS satellites;
- measuring, by the controller, a coordinate of the first vehicle by a reference of the traveling vehicle; and
- calculating, by the controller, a position of the traveling vehicle based on: the first coordinates of the GPS satellites and the first pseudo distances for each of the GPS satellites, the second coordinates of the GPS satellites and the second pseudo distances for each of the GPS satellites, and the measured coordinate of the first vehicle.

7. A vehicle positioning method according to claim 6, wherein the measuring includes measuring, by the controller, a relative coordinate for a position of the traveling vehicle as the coordinate of the first vehicle.

8. A vehicle positioning method according to claim 6, wherein the calculating includes calculating, by the controller, the position of the traveling vehicle based on a number of GPS satellites shared by the first vehicle and the traveling vehicle using different methods.

9. A vehicle positioning method according to claim 8, wherein the calculating includes calculating, by the controller, the position (X, Y, Z) of the traveling vehicle based on following Equation C, when a number of the GPS satellites shared by the first vehicle and the traveling vehicle is greater than 3 and less than 5;

$$(X-GXn)^2+(Y-GYn)^2+(Z-GZn)^2=(GnMD\_E-ECn)^2$$

$$(X+V1X-GXn)^2+(Y+V1Y-GYn)^2+(Z+V1Z-GZn)^2=(GnMD\_V1-VCn)^2 \quad \text{Equation C}$$

wherein, (GXn, GYn, GZn) denotes the coordinate of n-th GPS satellite, GnMD_E denotes the pseudo distance of n-th GPS satellite calculated by the traveling vehicle, GnMD_V1 denotes the pseudo distance of n-th GPS satellite calculated by the first vehicle, and Cn denotes a correction distance of n-th GPS satellite.

10. A vehicle positioning method according to claim 8, wherein the calculating includes calculating, by the controller, the position (X, Y, Z) of the traveling vehicle based on following Equation D, when a number of the GPS satellites shared by the first vehicle and the traveling vehicle is greater than 5;

$$(X-GXn)^2+(Y-GYn)^2+(Z-GZn)^2=(GnMD\_E-ECn)^2$$

$$(X+V1X-GXn)^2+(Y+V1Y-GYn)^2+(Z+V1Z-GZn)^2=(GnMD\_V1-VCn)^2 \quad \text{Equation D}$$

wherein, (GXn, GYn, GZn) denotes the coordinate of n-th GPS satellite, GnMD_E denotes the pseudo distance of n-th GPS satellite calculated by the traveling vehicle, GnMD_V1 denotes the pseudo distance of n-th GPS satellite calculated by the first vehicle, ECn denotes the pseudo distance of n-th GPS satellite for the traveling vehicle, and VCn denotes the pseudo distance of n-th GPS satellite for the first vehicle.

11. A non-transitory computer readable medium containing program instructions executed by a controller, the computer readable medium comprising:
- program instructions that receive first coordinates of global positioning system (GPS) satellites and first pseudo distances for each of the GPS satellites from a first vehicle;
- program instructions that receive second coordinates of the GPS satellites from the GPS satellites;
- program instructions that calculate second pseudo distances for each of the GPS satellites;
- program instructions that measure a coordinate of the first vehicle by a reference of the traveling vehicle; and
- program instructions that calculate a position of the traveling vehicle based on: the first coordinates of the GPS satellites and the first pseudo distances for each of the GPS satellites, the second coordinates of the GPS satellites and the second pseudo distances for each of the GPS satellites, and the measured coordinate of the first vehicle.

12. The non-transitory computer readable medium of claim 11, further comprising:
- program instructions that measure a relative coordinate for a position of the traveling vehicle as the coordinate of the first vehicle.

13. The non-transitory computer readable medium of claim 11, further comprising:
- program instructions that calculate the position of the traveling vehicle based on a number of GPS satellites shared by the first vehicle and the traveling vehicle using different methods.

14. The non-transitory computer readable medium of claim 13, further comprising:
- program instructions that calculate the position (X, Y, Z) of the traveling vehicle based on following Equation C, when a number of the GPS satellites shared by the first vehicle and the traveling vehicle is greater than 3 and less than 5;

$$(X-GXn)^2+(Y-GYn)^2+(Z-GZn)^2=(GnMD\_E-ECn)^2$$

$$(X+V1X-GXn)^2+(Y+V1Y-GYn)^2+(Z+V1Z-GZn)^2=(GnMD\_V1-VCn)^2 \quad \text{Equation C}$$

wherein, (GXn, GYn, GZn) denotes the coordinate of n-th GPS satellite, GnMD_E denotes the pseudo distance of n-th GPS satellite calculated by the traveling vehicle, GnMD_V1 denotes the pseudo distance of n-th GPS satellite calculated by the first vehicle, and Cn denotes a correction distance of n-th GPS satellite.

15. The non-transitory computer readable medium of claim 13, further comprising:
- program instructions that calculate the position (X, Y, Z) of the traveling vehicle based on following Equation D, when a number of the GPS satellites shared by the first vehicle and the traveling vehicle is greater than 5;

$$(X-GXn)^2+(Y-GYn)^2+(Z-GZn)^2=(GnMD\_E-ECn)^2$$

$$(X+V1X-GXn)^2+(Y+V1Y-GYn)^2+(Z+V1Z-GZn)^2=(GnMD\_V1-VCn)^2 \quad \text{Equation 2}$$

wherein, (GXn, GYn, GZn) denotes the coordinate of n-th GPS satellite, GnMD_E denotes the pseudo distance of n-th GPS satellite calculated by the traveling vehicle, GnMD_V1 denotes the pseudo distance of n-th GPS satellite calculated by the first vehicle, ECn denotes the pseudo distance of n-th GPS satellite for the traveling vehicle, and VCn denotes the pseudo distance of n-th GPS satellite for the first vehicle.

\* \* \* \* \*